United States Patent [19]

Fujibayashi et al.

[11] 4,330,188

[45] May 18, 1982

[54] FOCUSING SCREEN

[75] Inventors: Kazuo Fujibayashi; Kikuo Momiyama, both of Yokohama, Japan

[73] Assignee: Canon Kabushiki Kaisha, Tokyo, Japan

[21] Appl. No.: 161,433

[22] Filed: Jun. 20, 1980

[30] Foreign Application Priority Data

Jun. 22, 1979 [JP] Japan .................................. 54-78945

[51] Int. Cl.³ ............................................. G03B 13/28
[52] U.S. Cl. ...................................... 354/200; 350/286
[58] Field of Search ................. 354/200, 201; 350/286

[56] References Cited

U.S. PATENT DOCUMENTS 3,602,085  8/1971  Wagner .............................. 354/200
4,003,637  1/1977  Masuoka ............................ 350/286

FOREIGN PATENT DOCUMENTS 2821044  11/1979  Fed. Rep. of Germany ...... 354/200
  41027   9/1965  German Democratic Rep. .................................... 354/200

*Primary Examiner*—L. T. Hix
*Assistant Examiner*—Alan Mathews
*Attorney, Agent, or Firm*—Toren, McGeady and Stanger

[57] ABSTRACT

A focusing screen capable of showing an out-of-focus image in a conspicuous manner has a split prism forming portion on the central portion thereof which consists of a central area and a peripheral area surrounding the central area. Split prisms slanting in different directions are formed in the central and peripheral areas of the split prism forming portion.

4 Claims, 4 Drawing Figures

FOCUSING SCREEN

BACKGROUND OF THE INVENTION

1. Field of the Invention:

This invention relates to a focusing screen and more particularly to a focusing screen having a plurality of split prisms in the central portion thereof.

2. Description of the Prior Art:

Heretofore, there have been known focusing screens of the type in which a split prism arrangement is provided in the central portion thereof. The central portion is divided into an upper area and a lower area, and on each area a split prism is formed with the slant directions of the upper and lower split prisms being different from each other. One prism is slanted rightwardly and downwardly and the other is slanted leftwardly and downwardly. In such a focusing screen, an image of a rod-shaped object extending in upward and downward directions can be deviated to the left and right to show an out-of-focus condition thereof. However, with such a conventional focusing screen, it has been impossible to detect the condition of focusing on a rod-shaped object extending in the left and right directions.

To solve this problem, U.S. Pat. No. 3,602,085 discloses a focusing screen wherein the central portion of the focusing screen is divided into four areas with vertical and horizontal lines which intersect at the center of the screen; and on each of the divided areas a split prism is arranged, each split prism having a different slanting direction so that the focusing condition can be detected on rod-shaped objects extending horizontally as well as objects extending vertically.

SUMMARY OF THE INVENTION

It is a general object of the invention to provide a focusing screen which detects the focusing condition on rod-shaped objects extending horizontally and objects extending vertically with a novel structure.

According to the present invention, the central portion of the screen is divided into a central area and a peripheral area, each area being provided with a prism having a different slant direction.

The above and further objects, features and advantages of the invention will become apparent from the following detailed description of embodiments thereof taken in connection with the accompanying drawings.

DETAILED DESCRIPTION OF PREFERRED EMBODIMENTS

Figure 1:
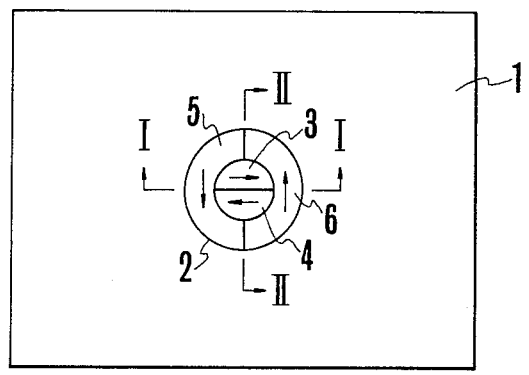
FIG. 1 is a plan view showing an embodiment of the focusing screen according to the present invention.
Figure 2:
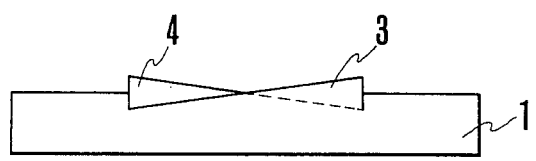
FIG. 2 and FIG. 3 are sectional views taken on lines I—I and II—II of FIG. 1.
Figure 3:
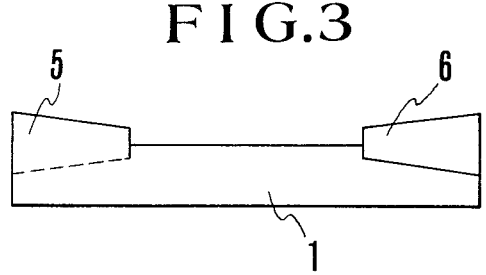
Figure 4:
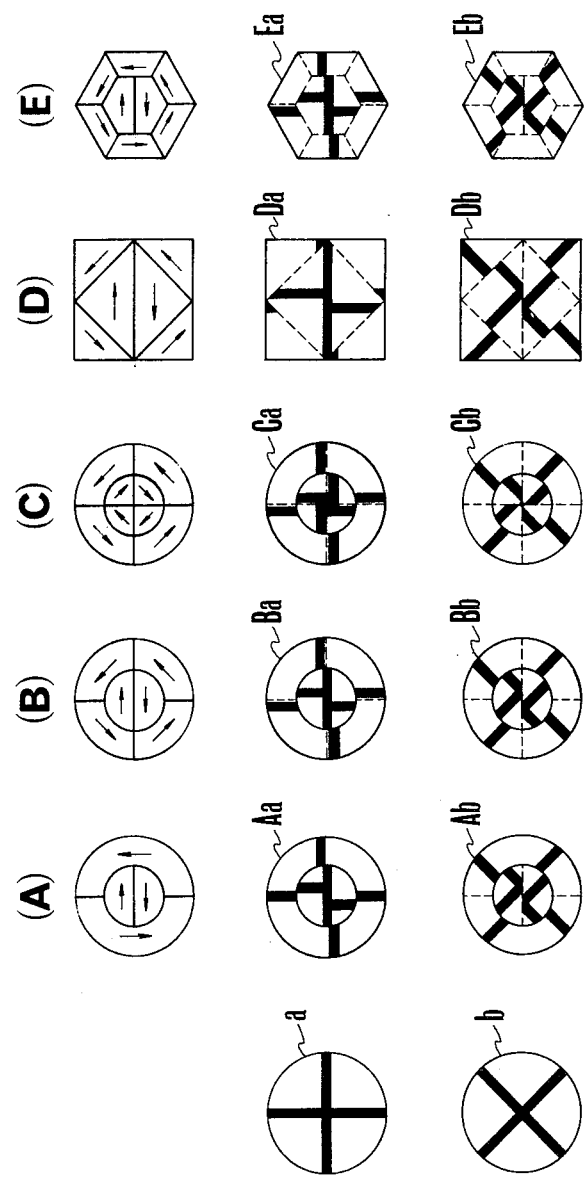
FIG. 4 shows various embodiments having different prism arrangements of the screen according to the present invention and the out-of-focus images obtained by these embodiments.

In the embodiment shown in FIG. 1, a focusing screen 1 is normally made of ground glass and is provided with a central portion 2 which is divided into a central area arranged with a pair of split prisms 3 and 4 and a peripheral area arranged with a pair of prisms 5 and 6. The prisms 3 and 4 have a different slant direction bordering along the horizonatal line passing the center of the central area. The prisms 5 and 6 have a different slant direction bordering along the vertical line passing the center of the central area. In FIG. 1, the arrows indicate the slant directions. FIGS. 2 and 3 are sectional views taken on lines I—I and II—II of FIG. 1. When objects a and b in FIG. 4 are observed by the screen having the prism arrangement as shown in FIG. 1 under an out-of-focus condition, the images of the objects a and b appear in the manner represented by Aa and Ab in FIG. 4. Thus, the focused conditions con be detected not only on the horizontally and vertically extending objects, but also on the obliquely extending objects.

(B), (C) (D) and (E) in FIG. 4 show other examples of prism arrangements of the invention. In these drawings, the arrows indicate the slant directions of prisms. When the objects a and b are observed under an out-of-focus condition by a screen provided with one of the prism arrangements, the images of the objects a and b appear as represented by Ba and Bb, Ca and Cb, Da and Db and Ea and Eb, respectively, so that focusing conditions can be detected for the objects extending in any of the vertical, horizontal and oblique directions.

The central areas having the prism arrangements (A), (B), (C) and (D) are identical with a conventional focusing screen only insofar as the central area alone is concerned. However, the present invention involves a structural feature relating to the peripheral area surrounding the central area and with respect to this peripheral area there is produced a novel splitting effect at the boundary line between the central and peripheral areas in combination with an additional splitting effect brought about by the peripheral area itself.

The prism arrangement (D) is similar to that of (B). However, the prism arrangement of (D) facilitates the manufacturing of the prisms because of their straight boundary lines. The prism arrangement (C) facilitates a focusing operation, because the split images in the central area and the peripheral area are arranged to rotate oppositely relative to each other during the focusing operation.

While specific embodiments of the invention have been shown and described in detail to illustrate the application of the inventive principles, it will be understood that the invention may be embodied otherwise without departing from such principles.

What is claimed is:

1. A focusing screen comprising:
    first split prism means located at a central portion on said screen arranged to effect image deviation at least in a first direction and in a second direction opposed to said first direction; and
    second split prism means arranged in the peripheral area surrounding said first split prism means, said second split prism means being arranged to effect image deviation at least in a third direction and in a fourth direction opposed to said third direction;
    said third and fourth directions extending transversely to said first and second directions.

2. A focusing screen according to claim 1 wherein the image deviating directions of said first split prism means and the image deviating directions of said second split prism means are perpendicular relative to each other.

3. A focusing screen according to claim 1 wherein each of said first and second split prism means comprises a plurality of split prisms, the deviating direction in the area of one being arranged to be opposite to the deviating direction in the other.

4. A focusing screen according to claim 1 wherein the deviating direction of said first split prism means is unidirectional while the deviating direction of said second split prism means is arranged to be effected in varying directions.

* * * * *